Nov. 21, 1939.　　　R. W. BAILY　　　2,180,660
APPARATUS FOR CONSOLIDATING PLASTIC MATERIALS
Original Filed May 14, 1934　　2 Sheets—Sheet 2
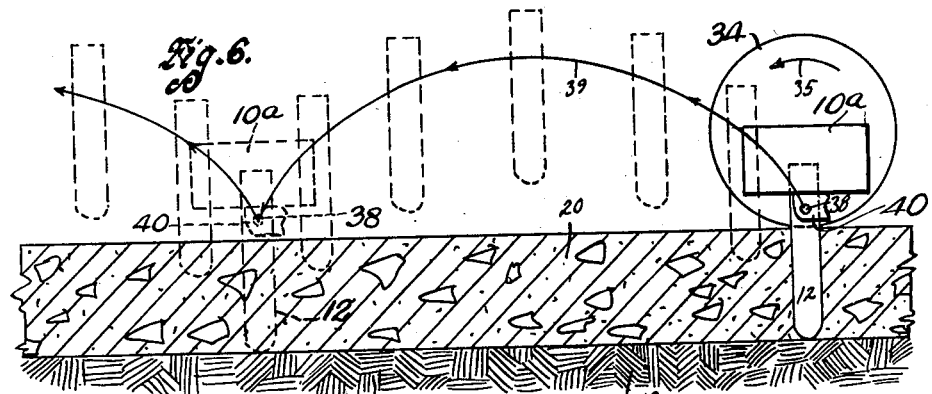
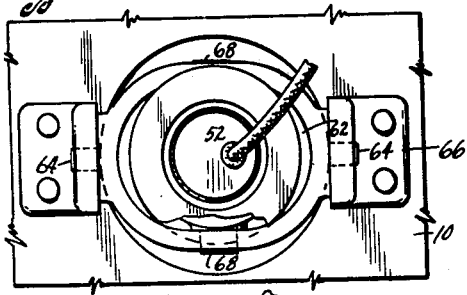
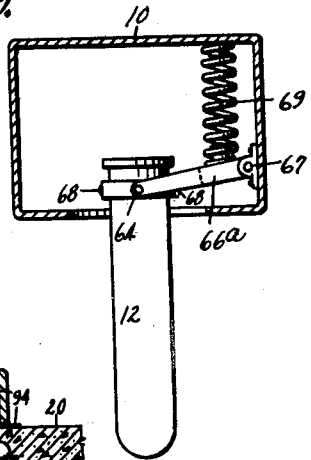
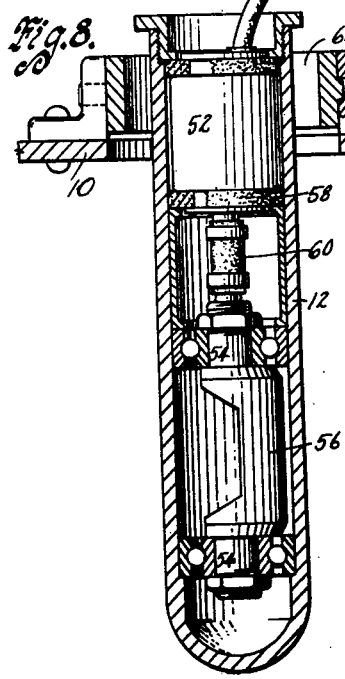
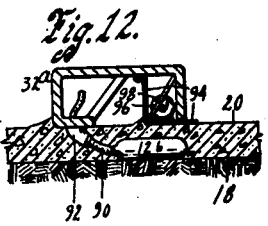
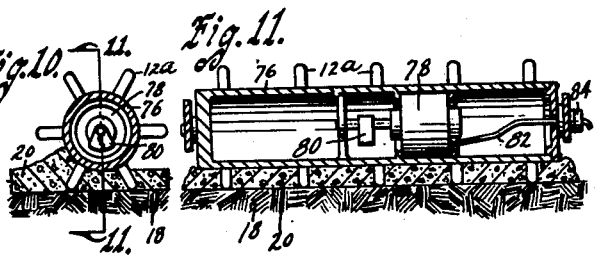
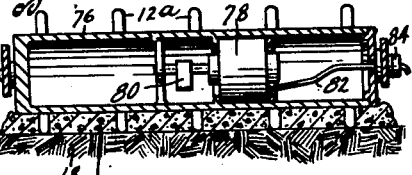
INVENTOR.
Robert W. Baily
BY Barr, Freeman &
Sinclair, ATTORNEYS.

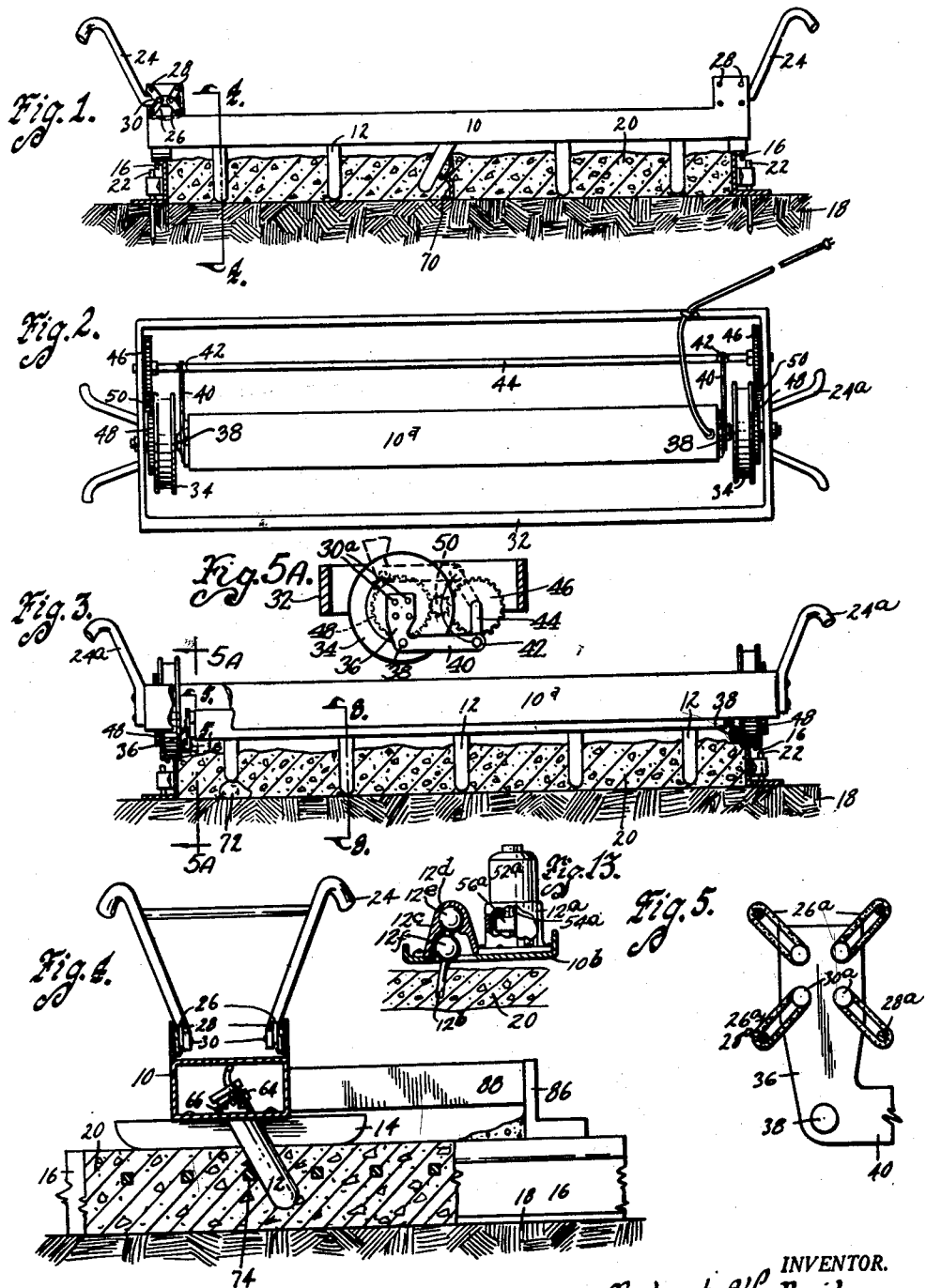

Patented Nov. 21, 1939

2,180,660

UNITED STATES PATENT OFFICE 2,180,660

APPARATUS FOR CONSOLIDATING PLASTIC MATERIALS

Robert William Baily, Narberth, Pa.

Continuation of application Serial No. 725,580, May 14, 1934. This application December 8, 1936, Serial No. 114,877

15 Claims. (Cl. 94—48)

An object of my invention is to provide a method of consolidating plastic materials by means of internally applied vibrations and an apparatus of simple, durable and inexpensive construction for practicing the method, the present application being a continuation of my co-pending application Serial Number 725,580, filed May 14, 1934.

Another object is to provide a method and apparatus for consolidating plastic materials by subjecting spaced points thereof to internally applied vibrations by means of a supporting member having a plurality of vibrators depending therefrom, the supporting member being movable to successive positions for subjecting the entire mass of a pavement or the like to the vibrations inasmuch as the concrete while still plastic and before initial set has occurred will be vibrated at considerable distance from the points at which the vibrating elements are inserted.

More particularly it is my object to provide a method for treating plastic material used for pavements and various other purposes, consisting of the subjection of the interior of the slab or mass of material to vibrations imparted to it by a plurality of vibrating mechanisms functioning at embedded positions in the plastic material.

Another object is to provide suitable apparatus including vibrating mechanisms adapted to be inserted into and drawn from or through the mass of plastic material so as to subject the same at suitable intervals to vibrations and thus result in properly consolidating the entire mass of the pavement or the like.

With these and other objects in view my method consists in the steps hereinafter designated and my apparatus consists in the construction, arrangement and combination of the various parts thereof, whereby the objects contemplated are attained, as set forth more in detail in my specification, pointed out in my claims and illustrated in the accompanying drawings, in which:

Figure 1 is a front elevation of one form of my apparatus for consolidating plastic materials by means of internally applied vibrations.

Figure 2 is a plan view of a slightly modified form of the invention.

Figure 3 is a front elevation of the form shown in Figure 2.

Figure 4 is a sectional view on the line 4—4 of Figure 1 showing the parts on an enlarged scale.

Figure 5 is an enlarged sectional view on the line 5—5 of Figure 3, showing a vibration elimination connection.

Figure 5A is a sectional view on the line 5A—5A of Figure 3.

Figure 6 is a diagrammatic view of the form of invention shown in Figures 2 and 3 and showing its action during operation.

Figure 7 is a plan view of one of the vibrating elements.

Figure 8 is a vertical sectional view of the same as taken on the line 8—8 of Figure 3.

Figure 9 is a similar sectional view showing a different mounting for the vibrating element.

Figure 10 is a vertical sectional view of a modified form of apparatus.

Fig. 11 is a longitudinal sectional view on the line 11—11 of Figure 10.

Figure 12 is a sectional view of another modified form of the invention; and

Figure 13 is a vertical fore and aft sectional view of a modified form of construction.

In making concrete pavements and concrete foundations for other wearing surfaces, the concrete is ordinarily placed upon the subgrade to such a depth that when struck off by a screed or planer, it will have the desired elevation and contour. Various methods have been used to consolidate the concrete. Frequently a screed or planer with a substantially vertical front face is drawn over the concrete. The screed may be moved by hand or by a finishing machine. Usually the screed rests upon the side forms between which the roadway concrete is deposited, and spans the concrete between the forms.

The screed is usually given a movement back and forth across the side forms, planing or scraping the surface of the concrete to the desired elevation and contour. This movement imparts to the concrete at the surface a slight kneading or working action which quite often produces a surface of pleasing appearance, but which does not beneficially affect the major portion of the concrete below its surface.

In some cases, the planing action is supplemented by tamping, this usually being accomplished by a plank or beam on edge, which is caused to oscillate in a vertical direction, having a considerable amplitude of movement, and on each downward stroke making an impact contact with the surface of the concrete. This serves to consolidate the upper portion of the concrete.

Due, however, to the inertia or dead weight of the concrete, the force of the impact or blow is absorbed by the upper portion of the concrete, with the result that the lower portion of the mass thereof is not beneficially affected.

Other methods more efficacious than the two above described consist in vibrating the screed, as described in my copending application Serial Number 428,747, filed February 15, 1930, or in passing over the surface of the concrete, a vibrating roller, as described in my Letters Patent Number 2,025,703, issued December 31, 1935.

The methods of my copending application and said Letters Patent apparently agitate the concrete mass to its full depth, but due to the fact that in both cases the vibratory energy is applied to the concrete mass at its upper surface, certain ill effects have been observed.

Obviously when the vibratory energy is applied to the surface of the concrete mass, the major portion of the agitation in the mass occurs in the upper layers thereof, and when enough energy is applied to the mass to produce sufficient agitation in the lower portion, the excess energy applied to the upper portion tends to bring to the surface various impurities, such as inert and non-cementitious materials, producing a condition called laitance. This produces a surface skin which is weak and tends to scale off, leaving the concrete surface rough and imperfect.

One object of my present invention is to agitate the entire mass to its full depth over a shorter period of time, thus providing less opportunity for these impurities to rise to the surface.

I have found that by applying the vibratory energy to the interior of the mass of material, at closely spaced locations and to the full depth of the mass, the concrete thereby receives uniform vibrating treatment through its full depth, eliminating all voids, expelling entrapped air and surplus water, and giving to the mass of concrete the maximum degree of density and resistance to the infiltration of moisture without causing the undesired impurities to rise to its surface.

By my present method and apparatus, I can apply vibration within the mass of concrete by inserting, at closely spaced intervals and to the full depth of the mass, vibratory units which may be similar to those described in my Patent No. 1,876,271.

I shall now describe illustrative types of apparatus which may be utilized for my purpose and then explain in greater detail the manner of practicing my method, although I may accomplish the same purpose with other forms of vibratory units and with modifications in the manner of their application to the plastic mass to be treated.

With reference to Figure 1, I show a supporting member 10. It is of box-like construction and my subsequent description of Figures 4 and 8 apply to it and to vibrating elements 12 depending therefrom. The supporting member 10 is provided with runners or the like 14 adapted to travel on side forms 16 of a subgrade 18. Concrete or other plastic material 20 is illustrated between the side forms and suitable hold-down rods 22 are associated with the side forms to retain them in position in the ordinary manner. The concrete 20 deposited between the side forms is initially roughly leveled off. The supporting member 10 spans the concrete between the side forms 16.

The supporting member 10 is provided with manipulating handles 24 which are preferably attached to the supporting member by rubber bands or the like 26 associated with pins 28 of the supporting member and pins 30 of the handles 24. This method of attachment is desired in order to prevent transmission of vibrations from the supporting member 10 to the handles 24 and is shown more in detail in my Letters Patent Number 2,018,294, issued October 22, 1935.

The supporting member 10 and its vibrating elements 12 can be raised and lowered, moved longitudinally of the roadway, or be otherwise manipulated by the handles 24.

The vibrating elements 12 are carried in such relation to the supporting member 10 that they may penetrate into the plastic mass 20 to any desired depth, preferably the full depth of the plastic mass as indicated.

In Figures 2 and 3 I show a supporting member 10a having the vibrating elements 12 depending therefrom. A frame 32 is provided having wheels 34, the frame and wheels therefor providing a carriage for the supporting member 10a. Handles 24a are secured to the carriage, but need not be provided with the connections 26, 28 and 30 as the supporting member 10a is provided with such connections between it and the carriage as will now be described.

A supporting plate 36 (see Figures 5 and 5A) is provided for each end of the supporting member 10a. Pins 28a extending from the member 10a and 30a extending from the plate 36, together with rubber bands 26a are provided as a means of connection between the supporting member 10a and the supporting plates 36. Each plate 36 is pivoted on a crank pin 38 and the crank pins are mounted off center on the carriage wheels 34 as best shown in Figure 5A. The plates 36 are provided with arm-like extensions 40 which are pivoted to crank pins 42 of a crank shaft 44. The crank shaft 44 has the throw of its crank pins equal to the distance off center of the pins 38 on the carriage wheels 34, it is suitably journaled relative to the frame 32 and it is geared by gears 46 and 48 and idler pinions 50 to the carriage wheels for rotation in the same direction and at the same speed so as to remain level (illustrated by a dotted line position in Figure 5A) in all positions of rotation of the carriage wheels 34 and thereby keep the supporting member 10a level at all times.

The vibrating elements 12 are preferably universally hung relative to the supporting members 10 and 10a. I have shown this more in detail in Figures 7 and 8 wherein the vibrating element will be observed as a casing within which is mounted an electric motor 52 and a vibrator shaft 54 having an off center weight 56. Rotation of the shaft 54 will cause vibration of the casing in a substantially horizontal plane when the motor is energized. The motor is mounted in resilient rings 58 of rubber or the like and has a flexible connection 60 with the shaft 54 so that the vibrations of the weight 56 are minimized in their transmission to the motor itself.

As a means of universal mounting, I have shown a ring 62 for each vibrating element 12 pivoted on a horizontal axis by means of pintles 64 mounted in brackets 66 secured to the bottom of the box-like supporting element 10 or 10a. The ring 62 in turn supports pintles 68 of the vibrating element 12 which are arranged on a horizontal axis at right angles to the axis of the pintles 64.

By the universal mounting just described, it will be obvious that the vibrating elements 12 will normally depend downwardly into the concrete mass 20, but can be deflected sidewise away from a center joint or the like shown at 70 in Figure 1, or may be deflected rearwardly to pass over rocks 72 or other obstructions as shown in Figure 3. In Figure 4, I have shown how they may be deflected to avoid interference with reinforcing bars 74.

It may also be desirable to provide a mounting which will permit the supporting ring 62 to be moved upwardly for permitting the vibrating element 12 to clear obstructions. I have provided for this by the construction shown in Figure 9, wherein instead of brackets 66, a forked arm 66a is pivoted at 67. A spring 69 holds the arm 66a normally in its lower position, but it can be raised relative to the supporting member 10 or 10a when the vibrating element strikes an obstruction which will not permit it to be moved downwardly.

In Figure 10, I have shown a drum 76 with vibrator elements 12a extending therefrom. Each of these elements may be provided with its own vibrator mechanism, such as shown in Figure 8, and instead of riding on side forms, the vibrators 12a may contact with the subgrade to thus space the drum, which acts as a leveler, at the proper distance from the subgrade. Either in conjunction with the vibrator mechanisms in the vibrators 12a, or without such mechanisms, a vibrator motor 78 may be mounted in the drum 76 itself and carry an off center weight 80 for imparting vibrations to the drum so that it can vibrate the elements 12a and they in turn can apply internal vibrations to the concrete.

It is obvious that the elements 12a may either be rigidly attached to the drum 76 and vibrated by the drum, or be flexibly attached to the drum in the same manner as the elements 12 are attached to the member 10 of Figure 1.

In this type of device, the electric wiring shown at 82 would have to be provided with collector rings or the like 84 to prevent twisting of the electric cable.

In combination with the vibrating elements, a screed or planer 86 may be provided either connected as by a frame 88 with the supporting member 10 or independent of the vibrating element support. Thus after the concrete is compacted by the vibrating elements, it is leveled off to the desired contour by the screed 86.

In Figure 12 I have shown another form of the invention in which a frame 32a is provided and vibrating elements 12b which are supported by flexible connecting tubes 90 extending from elbows 92. The elbows 92 plow through the plastic material 20, permitting the vibrating elements 12b to trail therebehind and assume positions entirely embedded in the plastic material and adjacent the subgrade.

In connection with either type of the invention, a screed plate 94 may be provided having a vibrator motor 96 and a vibrator weight 98 for vibrating it and thereby subjecting the surface of the concrete to vibrations as it is struck off by the plate 94.

When the vibrating elements 12 are operated within the plastic material 20, the energy from each element affects the plastic mass to a considerable distance in every direction. The elements are sufficiently close together so that the area each affects overlaps the areas affected by the adjacent elements, thus providing adequate vibration for the entire mass of the plastic material 20.

It is obvious that when the apparatus is positioned as shown in Figure 1, it will vibrate the plastic mass over a zone of considerable width measured laterally from the longitudinal axis of the member 10. In operation, when the plastic mass 20 has been sufficiently vibrated at one location, the apparatus may be dragged or lifted to a new position longitudinally of the roadway and there allowed to operate for a suitable interval, and by successive movements of this kind, the entire area of the plastic mass may be consolidated and compacted.

In many pavement and foundation structures, fixed objects occur, such as the center joint 70, large rocks such as 72, or reinforcing rods 74. If the elements 12 were rigidly attached to the supporting member 10, such objects might be displaced from their desired positions. For that reason, the vibrating elements are flexibly attached to the supporting member so that when objects are encountered, the vibrating elements may be easily deflected from their normal vertical positions.

In Figure 6 I have shown diagrammatically the action of the apparatus shown in Figures 2 and 3 as the wheels 34 roll along the side forms, rotating in the direction of the arrow 35. The crank pins 38 of the wheels 34 will travel in the arcs indicated by the arrows 39, resulting in the elements 12 supported by the member 10a successively assuming the dotted line positions illustrated after starting from the solid line position. The member 10a is illustrated in only two of these positions, namely, the starting position by solid lines and the dotted position after one revolution of the wheels 34.

This causes the elements to be withdrawn from the plastic mass 20 and reinserted at periodic points which are close enough together by proper designing of the circumference of the wheels 34, etc. that the range of vibration of the mass surrounding each element overlaps in the successive positions of the elements. Thus by merely rolling the carriage along the side forms, the vibrators are automatically inserted at equally spaced distances, instead of the spaces having to be measured or guessed at by lifting the apparatus of Figure 1 and then reinserting it manually.

Other means may be employed to secure the desired successive positions of the vibrating elements, or the vibrating elements may be moved longitudinally of the roadway, remaining in the concrete at all times. The apparatus shown in Figures 10 and 11 automatically inserts different sets of the vibrating elements at spaced points as the drum 76 rotates. The type of apparatus shown in Figure 12 is especially designed for operation by continuously moving the frame 32a along the roadway with the vibrating elements remaining continually in the concrete.

Ordinarily the planer or screed 86 operates sufficiently to bring the surface of the concrete to the desired contour. When the concrete has an extremely non-flowing characteristic, however, the vibrating plate 94 can be used, which additionally agitates the concrete and causes all voids remaining after the vibrator elements have passed through to be filled up.

Flexible tubing, springs, rubber rings and the like can be provided for supporting the vibrating elements 12, the types of supports I show being only by way of illustration. With respect to the vibrating mechanisms for the elements 12, they can be contained in the elements as disclosed, or the supporting members 10 and 10a can be vibrated for the purpose of vibrating all the elements 12 and without the necessity of providing each one with a vibrating mechanism.

In Figure 13 I show a modified form of construction in which the supporting member is indicated at 10b. It is caused to vibrate by a vibrator comprising a motor 52a, a vibrator shaft 75

54a and an off-center weight 55a. These parts are suitably mounted with a casing 12a being provided for the off-center weight. It will be noted that the axis of the shaft 54a is vertical so that the tendency upon operation is for the supporting member 10b to vibrate with a circular motion in a horizontal plane.

A vibrated element comprising a rod 12b depends from the supporting member 10b and is preferably pivotally connected therewith by a universal joint connection comprising a cone shaped casing 12c secured to the supporting member 10b and having a socket 12d to receive a ball head 12e on the upper end of the vibrator rod 12b. Intermediate the ends of the vibrator rod I provide a weight 12f.

The vibrator element 12b may be mounted rigidly with respect to the supporting element 10b, but I prefer to have it mounted as illustrated and described. By such an arrangement the rod 12b can swing in any direction to miss obstructions as already described in connection with the other forms of my invention and in operation the weight 12f has a tendency during the vibrating operation to swing the rod 12b to its vertical position. The vibrator weight 56a as it rotates tends to give to the socket 12d a rotary motion in a horizontal plane which causes a corresponding rotary motion of the lower end of the rod 12b in a horizontal plane about the center of the weight 12f as a pivot because of the inertia of the weight 12f tending to keep it in one position.

Some changes may be made in the construction and arrangement of the parts of my apparatus and the practice of my method may be somewhat modified without departing from the real spirit and purpose of my invention. Accordingly, it is my intention to cover by my claims such modified forms of structure, use of mechanical equivalents or use of equivalent method steps which may be reasonably included within their scope.

I claim as my invention:

1. Apparatus of the character described comprising a supporting member, a plurality of material vibrators pivotally attached thereto and depending normally substantially vertically from their pivots into the material to be vibrated, said supporting member being movable substantially parallel relative to the surface of the material and means for vibrating the supporting member in a horizontal plane and thereby imparting vibrations to said material vibrators.

2. In an apparatus of the class described, a supporting member, a plurality of vibrating elements attached thereto and means for vibrating said elements, said supporting member being movable relative to a mass of material for insertion of said vibrating elements downwardly from above into the mass, said vibrating elements being non-rigidly attached to said supporting member to permit each vibrating element to be moved and deflected from its normal position relative to and independent of the other vibrating elements, the means for non-rigidly attaching said vibrating elements to said supporting member comprising universal joints permitting both fore-and-aft and lateral movement of the vibrating elements relative to the supporting member.

3. In an apparatus of the class described, a supporting member, a plurality of vibrating elements attached thereto and means for vibrating said elements, said supporting member being movable relative to a mass of material for insertion of said vibrating elements downwardly from above into the mass, said vibrating elements being non-rigidly attached to said supporting member to permit each vibrating element to be moved and deflected from its normal position relative to and independent of the other vibrating elements and resilient means urging said vibrating elements downwardly relative to said supporting member.

4. Apparatus of the character disclosed comprising a supporting member, a carriage therefor, a plurality of vibrating elements attached to said supporting member and means for actuating said vibrating elements, said supporting member being movable relative to said carriage for alternate insertion of said vibrating elements into a mass of material at spaced points and removal from each point as the carriage moves, and means for automatically causing such alternate insertions as a result of movement of said carriage.

5. Apparatus of the character disclosed comprising a supporting member, a carriage therefor, a plurality of vibrating elements attached to said supporting member and means for actuating said vibrating elements, said supporting member being movable relative to said carriage for alternate insertion of said vibrating elements into a mass of material at spaced points and removal from each point as the carriage moves, said carriage including wheels and said supporting member being mounted for movement around the transverse axis of the wheels for automatically causing such alternate insertions of said vibrating elements relative to said mass of material.

6. Apparatus of the character disclosed comprising a rotatable supporting member, radially extending vibration imparting elements rigidly secured thereto and means for vibrating said supporting member and thereby said vibration imparting elements.

7. Apparatus of the character disclosed comprising a rotatable supporting member, radially extending vibration imparting elements thereon and means for vibrating said supporting member and thereby said vibration imparting elements, said supporting member being cylindrical and adapted to roll on the surface of a mass of material into which the vibration imparting elements project.

8. Vibrating mechanism comprising a support, a ring pivoted on a horizontal axis thereon, an internal vibrator element pivoted on a horizontal axis to said ring, such horizontal axis being at right angles to the pivotal axis of the ring to the support and means within said vibrating element for imparting vibrations thereto.

9. In an apparatus of the kind described, a supporting member, means for vibrating said supporting member, material vibrating elements attached to said supporting member and extending therefrom in such directions that some of the elements are not parallel to others thereof, said elements being rigidly connected to said supporting member and thereby partaking of the vibrations thereof, said supporting member being so arranged and supported that said elements are inserted into a material to be vibrated to vibrate said material while inserted therein, said supporting member being arranged to change its position so that when some of said elements that have been inserted in and been vibrating said material are being withdrawn from said material, others of said elements are being inserted in said material to vibrate said material in a manner to submit all parts of said material to vibration progressively during the movement of the supporting member across the material.

10. In an apparatus of the kind described, a supporting member, material vibrating elements attached thereto and extending therefrom in such directions that some of said elements are not parallel to others thereof, means for vibrating said elements, said supporting member being so arranged and supported that some of the elements may be inserted into a material to be vibrated to vibrate said material while inserted therein, said supporting member being arranged to change its position so that when some of said elements that have been inserted in and been vibrating said material are being withdrawn from said material, others of said elements are being inserted in said material to vibrate said material in a manner to submit all parts of said material to vibration progressively during the movement of the supporting member across the material.

11. Material vibrating apparatus, comprising a screed-like supporting device adapted to travel along the surface of a body of plastic material, vibrating members projecting downwardly therefrom, means for supporting the members for being alternately raised and lowered during travel of the device along the plastic material, and means for effecting vibration of the device and the members whereby the device vibrates the surface of the mass and the members vibrate the mass below the surface, when the members are in their lower positions.

12. Apparatus of the character disclosed, comprising a supporting member, a carriage therefor, a plurality of vibrating elements attached to said supporting member, each having a casing and a vibrator therein, and means for actuating said vibrating elements, said supporting member being movable relative to said carriage for alternate insertion of said vibrating elements into a mass of material at spaced points and removal from each point as the carriage moves.

13. Apparatus of the character disclosed comprising a carriage, a supporting member carried thereby, handles for manipulating said supporting member, vibrating elements attached to said supporting member, each having a casing and a vibrator therein, means for actuating each vibrating element, said supporting member being movable for insertion of said vibrating elements into a mass of material from above the material, and means for eliminating the transmission of vibrations from said supporting member to said manipulating handles and said carriage.

14. In an apparatus of the class described, a supporting member, a carriage for carrying said supporting member, a plurality of vibrating elements attached to said supporting member, each having a casing and a vibrator therein, and means for actuating said vibrating elements, said supporting member being movable relative to said carriage for alternately inserting said vibrating elements into a mass of material and withdrawing them therefrom as said carriage moves relative to said mass and thereby moves said vibrating elements laterally through the material.

15. In an apparatus of the class described, a carriage for traveling on forms, a supporting member associated therewith, vibrating elements associated with said supporting member, means for imparting vibrations to said vibrating elements, said supporting member being movable for alternate insertion of said vibrating elements into a mass of material and removal thereof from the material whereby the subsequent insertion of said vibrating elements into said mass of material may be at locations other than the locations of the first insertions, said supporting member being so arranged that while the vibrating elements are inserted in the material they may be propelled through the material at an elevation having a definite relation to the elevation of the retaining forms.

ROBERT WILLIAM BAILY.